Aug. 23, 1960  C. WEBER  2,949,826
DEVICE FOR REMOVING AND ROUTING PUTTIES AND OTHER MATERIAL
Filed Sept. 13, 1956  5 Sheets-Sheet 1

INVENTOR.
Carl Weber
BY John F Brezina
Att'y

Aug. 23, 1960 C. WEBER 2,949,826
DEVICE FOR REMOVING AND ROUTING PUTTIES AND OTHER MATERIAL
Filed Sept. 13, 1956 5 Sheets-Sheet 2
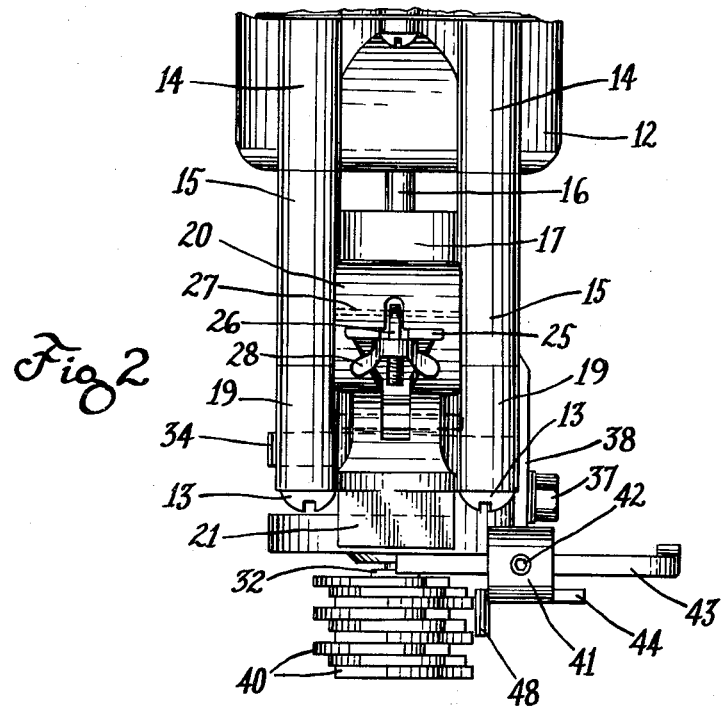
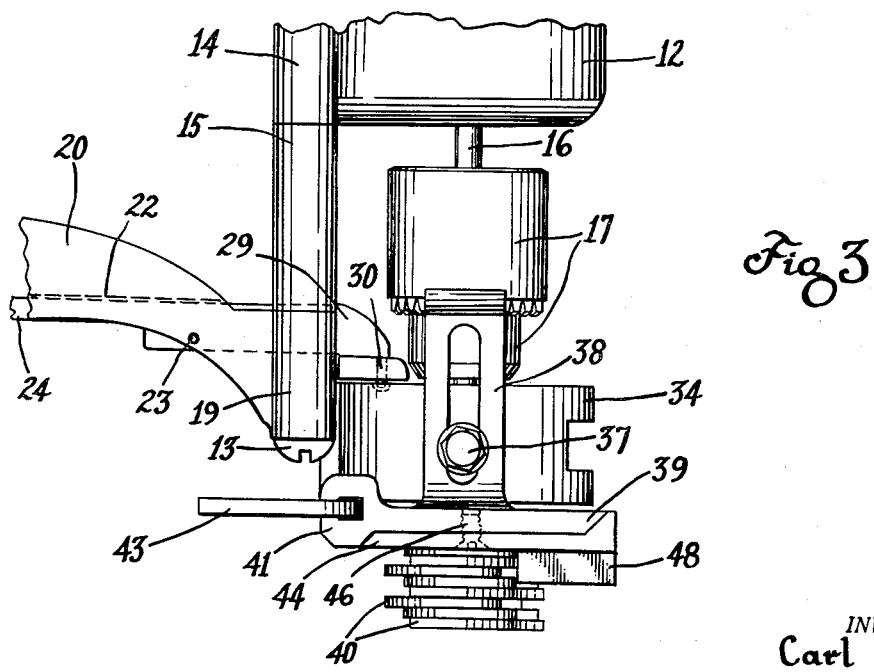
INVENTOR.
Carl Weber
BY John F Brezina
Atty Aug. 23, 1960     C. WEBER     2,949,826
DEVICE FOR REMOVING AND ROUTING PUTTIES AND OTHER MATERIAL
Filed Sept. 13, 1956     5 Sheets-Sheet 3

INVENTOR.
Carl Weber
BY John F. Brezina
att'y

Aug. 23, 1960  C. WEBER  2,949,826
DEVICE FOR REMOVING AND ROUTING PUTTIES AND OTHER MATERIAL
Filed Sept. 13, 1956  5 Sheets-Sheet 4

INVENTOR.
Carl Weber,
BY John F. Brezina
Att'y

Aug. 23, 1960            C. WEBER            2,949,826
DEVICE FOR REMOVING AND ROUTING PUTTIES AND OTHER MATERIAL
Filed Sept. 13, 1956            5 Sheets-Sheet 5

INVENTOR.
Carl Weber
BY John F. Brezina
Att'y

2,949,826
Patented Aug. 23, 1960

2,949,826

DEVICE FOR REMOVING AND ROUTING PUTTIES AND OTHER MATERIAL

Carl Weber, Box 215, Algonquin, Ill.

Filed Sept. 13, 1956, Ser. No. 609,760

6 Claims. (Cl. 90—12)

My invention is directed to a novel tool and device, which is adapted to be electrically driven, and which is adapted for quickly, easily and accurately routing out and removing hard putty and other relatively hard cementitious and original mastic material from window sash, frames and from grooves and other structural members, in a safe and precise manner and without cutting or damage to the sash or other structural members on which the material has been mounted.

Although the particular embodiment illustrated in the accompanying drawings illustrates an abrading routing and cutting element used as a putty removing member it is to be undersood that elements employing emery, sandpaper, circle and rotatable saws, or other abrasive or cutting elements (such as) or the like may be substituted for the abrading or routing element illustrated and still be within the scope of the inventive concepts embraced herein.

One of several unsolved problems and difficulties which have existed and which has prevented satisfactory routing out of hard putty mastic cement from the grooves of window sash and frames has been the inability and impossibility of accurately routing and cutting of the putty without also cutting out and cutting away parts of the wood rails which partially define the putty grooves. In all previous tools there has been no means or adjustable structure for limiting the depth of cutting and routing by the power driven rotating cutters and when the glass is mounted in the window sash.

A far greater part of the actual need for the proper and accurate removal of old and hard putty or mastic is in instances where no glass breakage has occurred and where no reglazing is required, and where weather-damaged and insecure hard putty has to be removed from the sash at areas outside of the edges of the various mounted panes of glass. Accordingly, there has been no tool previously devised which has had any adjustable structural features to accomplish the correct limitation of the depth to which the rotating cutters will descend as the cutters and manual tool are manually moved along the putty line. The failure of solution of the said problem of limiting depth of cut of driven rotating cutters has prevented the adoption and use of previous disclosed tools having removal of hard putty as their objective; this because it is impossible for a workman to avoid cutting and damaging of the wood parts of the window sash or window frame during the necessary free-hand movement of the tool and its cutters along the line of putty exteriorly of the panes of glass.

A further unsolved problem and difficulty with prior art tools having hard putty removal as their objective has been the difficulty in correctly and easily adjusting and controlling the width of the path of putty by the rotating cutters, both in instances where the glass is mounted in the sash or frame and in instances where the glass has been first removed, with exception of this applicant's previous structure embodying a manual adjustable "width-of-cut" gauge for the rotating cutters.

A third of several difficult and unsolved problems encountered in the power driven removal of hard putty and cement from window sash and frames has been caused due to the fact that in most instances of putty removal the workman is supported in position outside of the window frame, frequently on a ladder, and wherein he finds it often impossible to move and guide the cutter-carrying tool along both the left and right vertical rails and along both the lower and the upper horizontal rails of the sash or frame. The workman is either right or left handed and his close proximity to the main window frame and to the sash that forms a part of the building does not permit him to hold the drill and routing tool correctly in relation to both the left and right vertical sash rails and in relation to both the upper and lower rails. Further, the workman is normally positioned substantially centrally of the window, especially when on a ladder, and with tools previously known, he cannot position and hold the electric motor and tool so that successive strokes may be made on the left and upper rails as well as on the right, it being necessary that the successive strokes must be in a clock-wise direction in relation to the window sash. This impossibility is due in numerous instances to the closeness of the main window frame to the putty lines which does not permit sufficient clearance for movement and proper positioning of the tool and its driving motor.

It is therefore one of the important objects and accomplishments of my invention to provide a novel routing tool adapted for removal of hard putty from mounted sash and for cutting away small and narrow parts of a hard material, which has a rotatably mounted and adjustable head which carries one or more adjustable depth guides and adjustable width-of-cut guide, which said guides are adapted to slidably engage parts of both the left and the right hand sash rails and both the upper and lower sash rails, at the same time permitting the tool and its motor to be maintained inward of such rails with ample clearance for stroke movements.

A further object and accomplishment of my invention is the provision of a novel tool of the described class which includes a manually adjustable handle which has means for releasably securing the same in any of a plurality of different angles or radially extending positions in relation to the cutter carrying head and in relation to the different rails of the sash, this enabling the user to selectively position and pre-set such handle for proper and satisfactory operation.

A further object and accomplishment of my invention is the provision of a portable cutting and routing tool of the described class having a manually adjustable guide for limiting the depth of cutting and routing and a portion of which guide is adapted to ride on the cleaned portion of the grooves from which putty has been removed by the rotating cutters.

A further objective and accomplishment of my invention is the provision, in a machine or device of the described class, of a manually adjustable guide for varying the width of cut of a plurality of adjacent cutters to thereby prevent damage and cutting away of the ridge portions of sash.

A further objective and accomplishment is the provision of a second adjustably and removably mounted guide for controlling the width and path of cutting and routing, and which guide is adapted to slide along one of the normally vertical faces of the sash rails or along the vertical faces of the stationary window frame.

A further objective and accomplishment of my invention is the provision of a power drivable cutting and routing tool having the aforesaid features and which is adapted to be quickly and easily mounted in the chuck of a portable electrically driven tool, and also quickly and easily removed from such portable tool, or optionally substantially secured thereto by screws or the like.

Other and further important objects of my invention will be apparent from the following description and appended claims, reference being had to the accompanying drawings and numerals of reference thereon.

On the drawings:

Fig. 2 is a view looking at one side of said tool and showing the adjustable handle in end elevation and with the width-cutting guide in end elevation.

Fig. 3 is an elevation thereof, with only a fragment of the electric drill being shown, and showing the side of the said tool which is at the right of Fig. 2, and which is the reverse or back-side in relation to Fig. 1.

As shown on the drawings:

Figure 1:
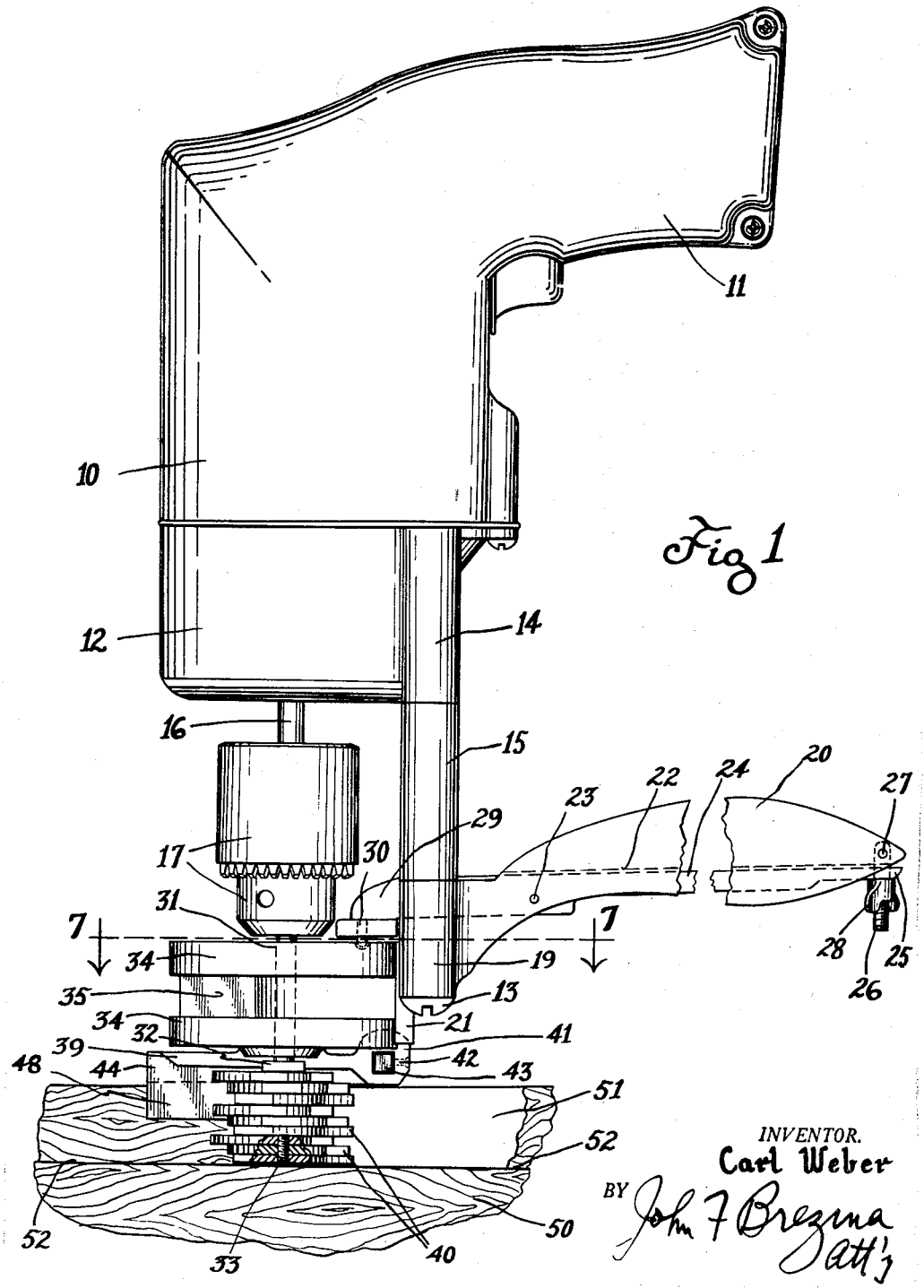
Fig. 1 is a top elevation view of my novel putty routing and cutting tool illustrating a fragment of a sash rail, the said tool and the shown portion of a portable electric drill being shown from above, and illustrating the head and its guides in right hand position in relation to the handle.

Numeral 10 designates a conventional typical portable electric drill having the usual handle or grip 11 and having a removably mounted metal casing or head 12 which is removably secured by a plurality of screws or bolts to the metal housing of the electric drill. In the illustration shown, a part of screws 13 are utilized to hold said head casing 12 by passing through passages of spacing sleeves 15 and integral bosses 14 forming part of the head 12 and threading in internal threads (not shown) of said bosses 14.

Numeral 16 designates the electric motor armature shaft on which a conventional gripping chuck 17 is secured.

Figure 4:
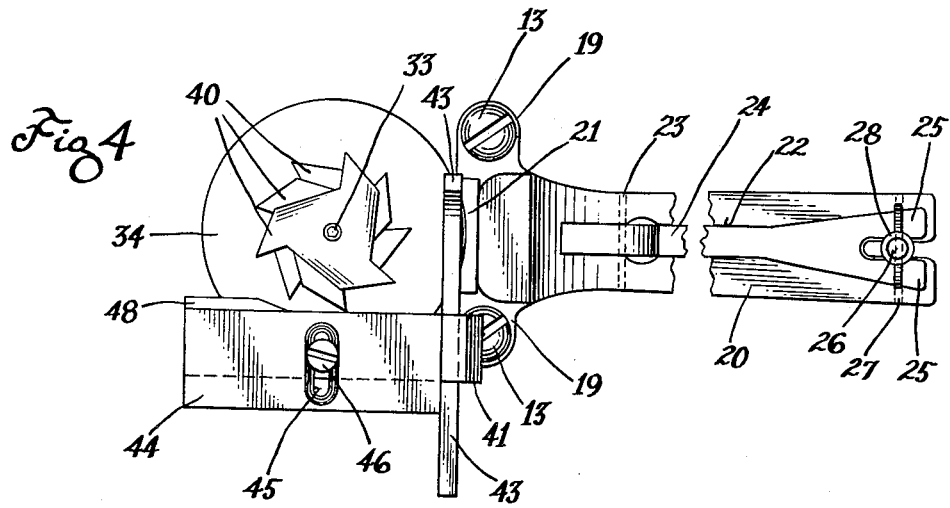
Fig. 4 is a bottom plan view, with parts broken away, illustrating the head and attached guides positioned to the normal right side of the user of the tool.
Figure 5:
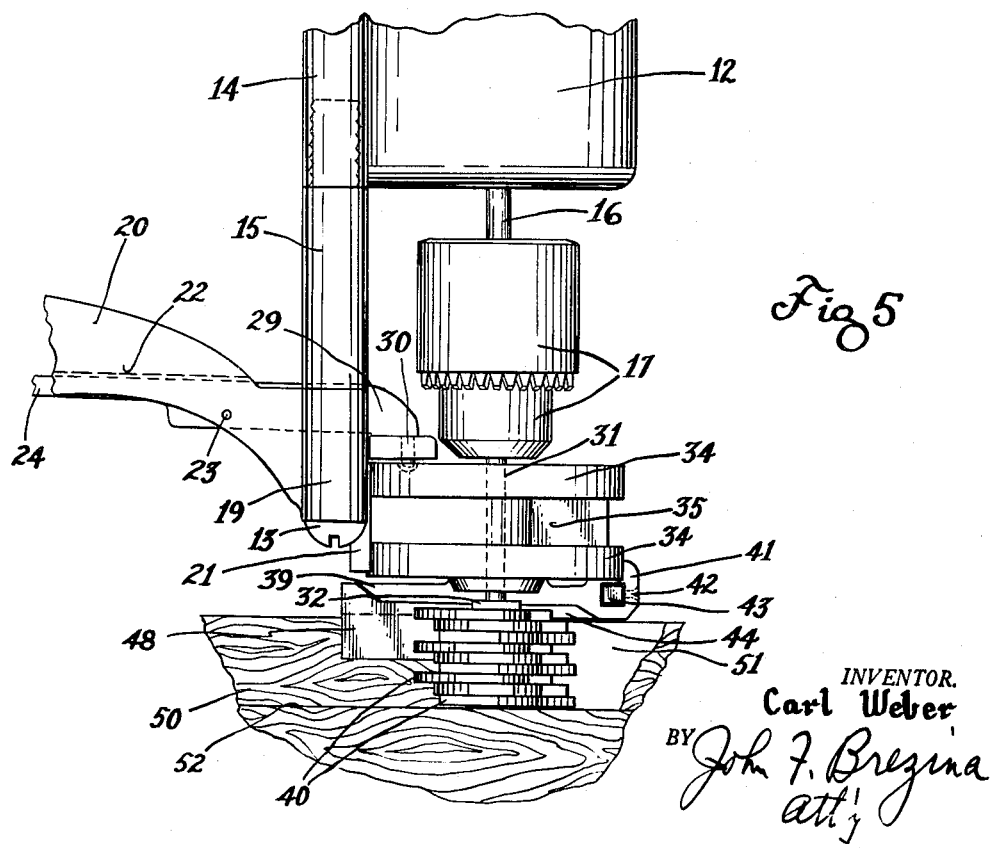
Fig. 5 is a top elevation looking at a portion of the driving motor and the head from above, and illustrating the horizontal and substantially perpendicular position in which the tool and motor is normally maintained, in relation to a fragment of an upwardly opening groove of a sash rail, and showing the rotatable head and guides in a left hand position in relation to the handle.
Figure 6:
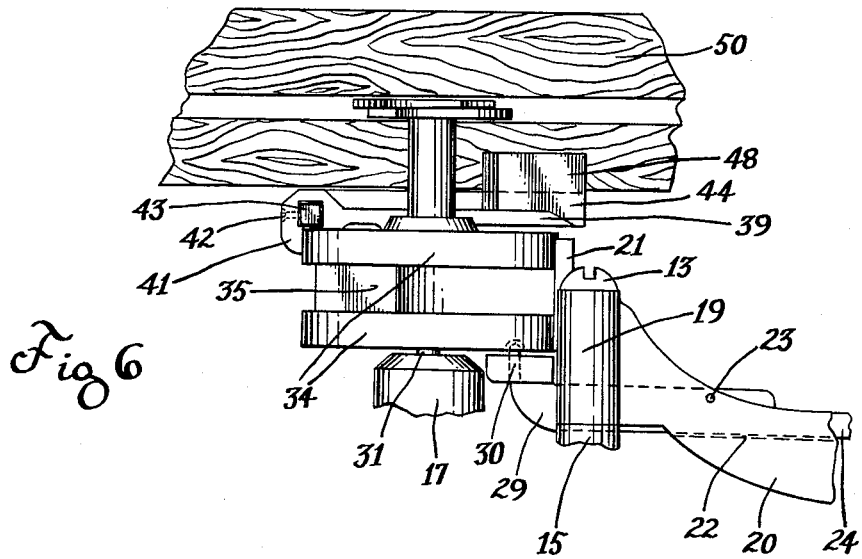
Fig. 6 is a view looking at one side of a fragment of said tool and looking at the inside face and groove of a sash rail which has a substantially U-shaped putty carrying groove therein.

As illustrated in Figs. 1, 3, 4 and 5 numeral 20 designates a metal recessed curved handle which has a pair of transversely extending apertured integral ears 19 and an integral arcuate flange 21, as illustrated in Figs. 1, 4 and 6. Said screws 13 extend through the apertures of said ears 19, through metal spacer sleeves 15 and same threadingly engage the interior threads of bosses 14, so that said handle is rigidly mounted in relation to said head 12 and its motor housing.

Said handle 20 has a longitudinal recess 22 therein, as indicated by dotted lines in Figs. 1 and 4, and has a longitudinal passage in its inner portion and aligned transverse passages are formed therein in which is mounted a metal fulcruming pin 23 (see Figs. 1, 5 and 6).

A metal lever 24 is fulcrumed intermediate its ends on said pin 23 and its outer end is recessed to provide a bifurcated end 25. A threaded stud or bolt 26 is pivoted in the outer end of handle 20 by a cross pin 27 (Fig. 1) and carries a thumb screw 28 which is adapted to be released to permit a pivoting movement of lever 24 to a limited extent, and which is adapted to hold said lever in head-locking position when it is in tightened position.

Figure 7:
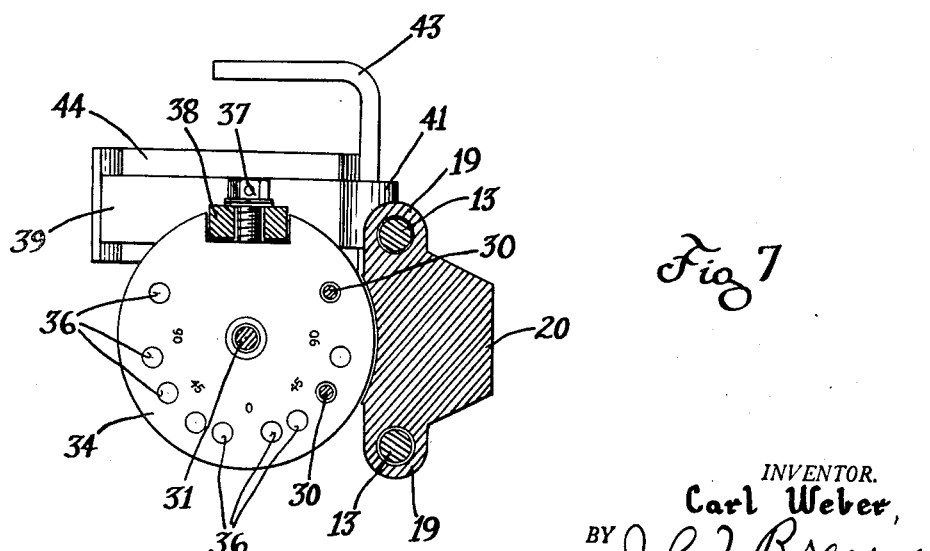
Fig. 7 is a cross sectional view looking downwardly and taken substantially on a horizontal plane indicated by line 7—7 of Fig. 1.

As shown in Figs. 1, 3, 5 and 6, said lever 24 has an integral forward nose or projection 29 which carries a pair of short spaced apart metal studs 30, said studs being shown in Fig. 1 and shown partially in dotted lines in Fig. 5 and in cross section in Fig. 7. The releasable locking function of said studs will be hereinafter described.

Numeral 31 illustrates a metal shaft or spindle of a size to have one end thereof releasably mounted in a standard chuck. Said shaft 31 has secured thereon a thrust ring, collar or flange 32, and the outer end portion of said shaft is of substantially square shape to facilitate staggered mounting of a plurality of radially extending cutters which preferably have square or non-round center holes, as partially illustrated in Fig. 1. The extreme end portion 33 of said spindle 31 is reduced and threaded, as shown in Fig. 1, so that the two outermost cutters or routers may be threaded on said threaded end of said spindle to thereby lock and hold the outer inner cutters and the inner cutters in impinged position (see Figs. 1).

A rotatable metal rotor or mounting head 34 having a central passage is journalled on the inermediate portion of spindle 31. Said rotor or head 34 has a central peripheral arcuate recess 35 (Fig. 6) extending a part of the distance about its periphery, as illustrated in Figs. 1, 3, 6, 8 and 9. The portion of head 34 adjacent the chuck receiving part of spindle 31 is provided with a plurality of circumferentially spaced recesses or notches 36 (see Fig. 7), which are adapted to receive and have releasably seated therein the two studs 30 of nose 29 of lever 24. Said recesses 36 are so positioned that the head or rotor 34 may be selectively adjusted and positioned in any one of a plurality of positions within 180 degrees, in relation to the handle, and so that the guiding means herein described may be either on the left or the right side of the handle 20, or in different angular positions between such extreme right and left positions of the guiding means. This selective adjustable positioning is of extreme advantage in proper operation and use of the tool for the following reasons:

When removing hard putty on the right and lower rails of a sash, the normal right handed person holds his right hand on the grip or handle of the portable chuck-carrying drill, and his left hand grips the handle 20 which has been pre-set by aforesaid adjustment so that the longitudinal axis of the handle 20 will be at an angle (either 90 degrees or less than 90 degrees) to the line of putty as well as to the path of proposed movement of the guides and gauges. This keeps the user's left hand clear of and away from the stationary adjacent parts of the window frame and also permits the user to place and cut in and from the corners of the sash, which are usually deeply inset from the outer face of the building, thereby allowing ample room for the user's hand holding handle 20 when in such corner areas. Additionally, such gripping of the angularly positioned handle permits the user to reach up and to reach down to the upper and lower corners while he is in a given position (frequently on a ladder) and at the same time applying substantially even pressure to the device for the desired speed of routing out and removal of the putty, mastic, or other semi-solid or brittle material.

When the user has removed the putty from the right hand vertical grooves of a sash, and desires to remove the putty from the lower or the upper horizontal line of putty on the sash, he may quickly and easily move the rotor and the gauges and the guides thereon to other angular positions in order to maintain the handle 20 and his hand at the most desirable angular positions in order to make successive clockwise strokes of the desired pressure upon and into the horizontal putty lines until the depth limit guide means hereinafter described stops the movement of the cutters toward the base of the putty grooves.

When the left vertical line of putty is to be removed, the user will re-set the rotor into a position substantially 180 degrees (in relation to the gripping handle) from which it was set for the right hand grooves, and will proceed to make successive strokes, in a clockwise direction, along the left vertical lines of putty, until the depth-of-cut limiting means has stopped the movement of the cutters toward the base of the grooves. In the latter position wherein the left hand and upper lines of putty are to be removed, the normal user will grip the handle 20 with his right hand and hold the grip of the electric motor in his left hand, as normally he is restricted to stand facing the central part of the window sash, this frequently on a ladder where substantially change of relative position of body is normally impossible.

It is to be borne in mind that most removal of hard putty is necessarily performed while the sash is mounted in the building and wherein the relative position of the sash cannot be changed as may be the case where an individual removed sash is placed on a bench. Here again the selective angular positioning of the rotor and its guiding means enables the user to reach the cutters into the deep-set upper left and lower left corners of the sash.

Such changeable angular positioning, for example with the handle at about 45 degrees to a line passing through the wood engaging faces of the guides and gauges, is especially advantageous where the lines of putty are curved or round, as is the case in numerous windows, and where a rigid guiding means would be impossible to use for proper performance.

As illustrated in Figs. 2, 3, 8 and 9, the central portion of the annular face of the rotor 34 has a threaded screw 37 removably and adjustably threaded in a threaded hole thereof (not shown). A longitudinally slotted metal bracket 38 has an integral mounting plate 39 disposed perpendicularly thereto, said bracket 38 being adjustably positionable in a direction parallel to the axis of the spindle or shaft 31, and either outwardly or inwardly in relation to the plurality of rotors or cutting blades 40 which are replaceably mounted upon the end of said spindle 31, as previously stated. The head set screw 37 preferably has a friction washer under it, as illustrated, which normally frictionally bears against the outer face of the bracket 38, said washer being illustrated in Figs. 2 and 3.

One end of said mounting plate 39 terminates in a bevelled end, as shown at the right in Figs. 3 and 6, and the opposite end of said mounting plate carries an integral transversely passaged head portion 41, the latter being illustrated in Figs. 1, 2 and 3.

An auxiliary substantially right-angled metal depth-of-cut limiting guide 43 is removably, slidably, and adjustably mounted in the transverse passage of said head portion 41 (see Figs. 2, 3, 5, 7, 8 and 9), and an adjustable set screw 42 is threaded in said head portion 41 of said mounting plate 39, as illustrated in Figs. 2 and 6. The function and performance of said auxiliary depth-of-cut guide 43 will hereinafter be described.

As shown in side elevation in Fig. 3, and in bottom plan view in Fig. 4, an adjustable width-of-cut guiding means is provided, the preferred form illustrated showing a metal plate or guide 44 which is provided with a central transversely extending slot 45 and which is removably and adjustably mounted against the outer flat face of the mounting plate 39 by means of a set screw 46 whose head is substantially conical and countersunk in the bevel defining the slot 45, so that said screw will not normally project beyond the outer face of said width-of-cut guide 44. It will be understood that the outer face of the guide or plate 44 will normally slidably engage the side face of the rails of a window sash so as to permit the operator to maintain the desired proportion of the cutters inwardly of the side face of a sash rail.

I provide also an adjustable guiding and limiting means to control and limit the depth to which the cutting parts of the rotating cutters can cut in relation to the outer face defining the putty groove of the sash rails. In the preferred form as illustrated, such depth-of-cut limiting and guiding means comprises a metal extension, arm or plate 48 which is integral with and perpendicular to one lateral edge of the width-of-cut guide 44 and perpendicular to the plane of the mounting plate 39 of the bracket 38 (said bracket 38 comprising a part of the width-of-cut gauge means). In Fig. 4 the normally inner edge of the depth-of-cut-gauge 48 is illustrated. In Figs. 1, 3 and 5 the flat face of said depth-of-cut gauge is illustrated; in Fig. 6 the normally outer flat face of gauge 48 is illustrated and in Figs. 8 and 9 one end portion of said gauge 48 is shown.

The gauge plate 44 is adjustably positionable and securable with the aid of the set screw 46, toward or away from the axis of the driven rotating cutters, and it will be understood that the outer end portions of said cutters 40 will rotate through the path defined by the outer flat face of gauge plate 44 and the inner merging face of the depth-of-cut gauge 48.

Figure 8:
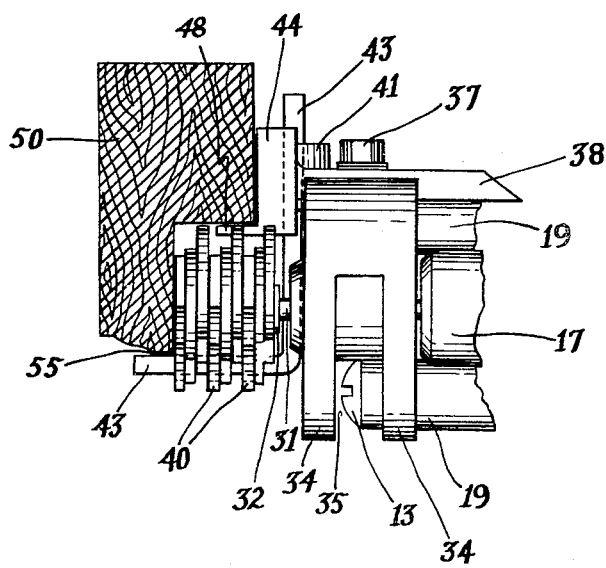
Fig. 8 is an enlarged fragmentary view of the head portion, guides and attached parts, illustrating the position of the auxiliary depth guide 43 in sliding engagement with the lip or ridge of a sash rail, which rail is shown in cross section and when the glass pane has been removed.

In Fig. 1, is shown a sash rail 50 which carries a line or strip of hard putty or mastic 51 in the right-angled groove 52, the respective cutters 40 having removed a short section of said putty, by the making of successive strokes during power driven rotation of said cutters, down to the sash face which partially defines the putty groove. By proper pre-setting, according to the maximum depth of the strip of putty and the groove, and after one or several cutting strokes, the depth-of-cut guide 48 will contact and slide along the face of the sash to thereby prevent any deeper penetration or cutting of the points of the cutters 40. This is likewise true in Fig. 5 in which said depth-of-cut gauge 48 will, by engaging the wood sash, limit the depth to which the points of the cutters can reach. In Figs. 2 and 4 the said depth-of-cut guide 48 and the adjustably mounted guide plate 44 are illustrated as moved to extreme positions in order to illustrate the same, in which extreme positions the cutters would not contact the putty. In Fig. 8 the depth-of-cut guide 48 has reached the face of the sash groove, as when all the putty has been removed, and the slidable contact plate of guide 44 is in sliding engagement with the side face of the sash rail. The described width-of-cut guide and its mounting bracket 38 has been pre-set with the aid of set screw 37 so that the degree of projection of the group of cutters beyond the outer face of the width-of-cut guide is equal to the width of the strip of putty to be removed, or equal to the width of the sash groove itself.

In Fig. 8 the auxiliary depth-of-cut guide 43 has been pre-set and mounted in such a position that its perpendicular leg, shown at the left of Fig. 3, will contact and slidably engage the innermost face of the ridge 55 of the sash 50 to thereby also limit the depth to which the cutters can cut and thereby prevent the ends of said cutters from cutting away any of the sash itself. Said auxiliary depth-of-cut guide is utilized in the last mentioned position, in instances where a pane of glass has been substantially removed. In another position of said auxiliary guide 43, as illustrated in Fig. 9, the bent leg of the said auxiliary guide 43 is pre-set to slidably engage the inner flat surfaces of the staionary window frame to guide and limit the depth of cutting of the cutters, and regardless of whether or not the glass pane is mounted in the sash.

Figure 9:
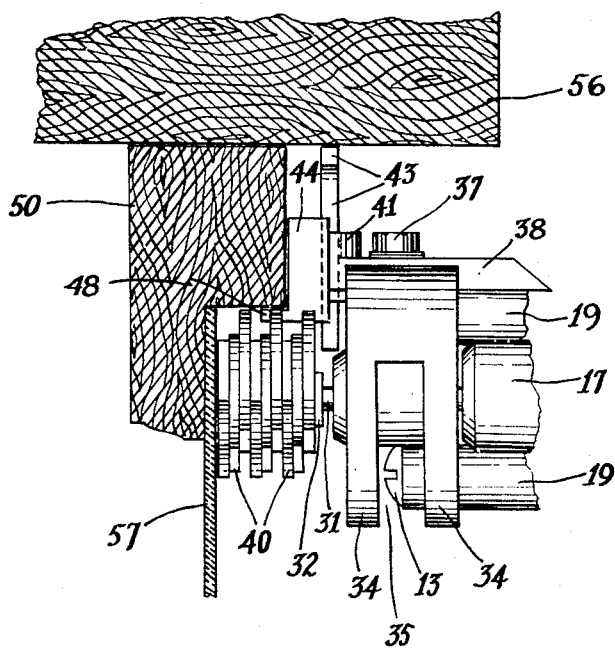
Fig. 9 is an enlarged elevation of the head portion of my device, illustrating its typical position in relation to a sash rail having a glass pane therein, and in relation to the stationary window frame shown in cross section and illustrating another working and sliding position of the auxiliary guide 43.

In Fig. 9, I illustrate a cross sectional fragment of a stationary window frame 56 and a cross sectional fragment of a rail of a slidable window sash 50 in which the normal pane of glass 57 is mounted. Where the glass remains mounted in the sash and only removal and replacement of putty is desired, the auxiliary guide 43 is remounted in reverse position to that shown in Fig. 8, so that its right-angled leg portion will be in such a position as to contact and slide along the respectively inner face of the stationary window frame 56 to thereby limit the inward penetration of the cutters when the extremities thereof have reached the wood sash, to thereby prevent damage to the latter and at the same time permitting complete removal of all of the putty or equivalent material.

In instances such as illustrated in Fig. 9, the width-of-cut guide 44 and its mounting bracket 38 have been pre-set and secured with the aid of set screw 37 so that the sliding engagement of the face of the guide plate 44 with the sash will normally maintain the endmost of said cutters 40 out of contact with the pane of glass 57. It has been found that even if the said tool is moved angularly away from the perpendicular to the pane of glass during operation, the contact of the endmost rotating cutter 40 with the pane of glass will not damage the glass pane.

As the respective cutters are normally power driven in a clockwise direction with respect to an operator holding said tool in normal operating position, and the cutters are so formed to present their principal cutting edges in a forward clockwise direction, it is of advantage for the operator to make the successive cutting strokes in a clockwise direction in relation to the window sash and to successively pull the rotating cutters into the strip or line of hard putty. For example, in the removal of the vertical putty line to the user's right and lower horizontal putty line of the sash, the user will move and pre-set the rotor 34 and the said gauges connected thereto in a position such as illustrated in Figs. 1 and 4 in which positions he will grip the handle 20 with his left hand and in which positions the depth guide 48 will be inward of the sash and behind the strokes of movement of the cutters.

When the vertical left line of putty and the upper downwardly facing line of putty is to be removed it is of great advantage for the operator to shift and pre-set the position of the rotor in the manner hereinbefore described and its guides to a position wherein the said guides will be on opposite sides of the gripping handle 20 and wherein the depth-of-cut guide 44 will be inward of the sash and line of putty being removed while the operator makes his successive cutting strokes in a clockwise direction while gripping the handle 20 in his right hand and gripping the motor handle 11 in his left hand.

I desire it to be understood that my said device is not limited in its satisfactory uses to putties; it is also highly satisfactory for cutting away and removing many other materials such as various mastics, fibre, wood, Bakelite, Formica, plastics, weather stripping, calking compounds, rubber and the like. For example, in using my said novel device for removing the edge portions of sheets made of plastic, fibre, Formica or other material capable of being cut, the described width-of-cut guide will be pre-set and adjusted so that the degree of projection of the rotated cutting and routing means will correspond to the amount and extent of material to be removed, with respect to the direction corresponding to the axis of the driven shaft which carries the cutting and routing means. In utilizing said cutting and routing tool in connection with sheets or strips of material such as fibre, wood, Formica, plastic and the like, the depth-of-cut guide 48 will act as a stop to limit the depth of cutting and routing as desired.

While I have, in the preferred embodiment illustrated and shown a plurality of cutters for routing elements mounted on the end of the driven shaft, I desire it to be understood that the term "cutters" or "cutting elements" as herein used encompasses various equivalent cutting, abrading or grinding units which, when rotatably driven, are adapted to remove materials of the described classes.

The uses of my said device reduce the labor and time to a small fraction of that which has normally been required by presently known and presently practiced hand methods.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a portable tool adapted for cutting and removing material from sash or other building units; a housing, a grippable handle adapted to be fixedly connected to the housing, an electric motor mounted at one end of said housing; drive shaft means extending from said motor; a head supported on said drive shaft means for relative rotational movement with respect to said housing and said handle; toothed cutters secured to the free end of said drive shaft means; means for releasably locking said head to said handle including a lever pivotally carried by said handle adapted to operatively engage said head and prevent relative rotational movement of said head with respect to said handle; a bracket slidably mounted on said head for movement axially with respect to the axis of said drive shaft means, said bracket having a plate-like portion disposed in a plane normal to the rotational axis of said drive shaft means; means for locking said bracket to said head; a substantially L-shaped member having one leg thereof slidably mounted on said bracket plate-like portion for movement radially with respect to the rotational axis of said drive shaft means, one substantially flat surface of said member disposed in a plane normal to the rotational axis of said drive shaft means and serving as a work-engaging surface and a second substantially flat surface of said member disposed in a plane normal to the plane of said first mentioned surface and serving as a second work-engaging surface; and means for locking said member to said bracket.

2. In a portable tool substantially as set forth in claim 1, including an L-shaped bar having one leg thereof slidably mounted on said bracket plate-like portion and the other leg having a work-engaging surface disposed in a plane substantially parallel to said second work-engaging surface; and means for locking said bar to said bracket.

3. In a driven routing device for use with a portable electric motor; a grippable handle fixedly connected to the housing of the electric motor; drive shaft means operatively connected to said motor; a head supported on said drive shaft means for rotation with respect to said drive shaft means and with respect to said handle; a plurality of cutters on the outer end of said drive shaft means; means for releasably locking said head to said handle whereby said head may be rotated about the rotational axis of said drive shaft means to various positions with respect to the housing of said motor, said releasable locking means being supported by said handle; and a plurality of work-engaging surfaces adjustably mounted on said head.

4. In a drivable routing device for use with a portable electric motor; drive shaft means operatively connected to the electric motor; a grippable handle fixedly connected to the housing of said motor; a head rotatably supported on said drive shaft means adjacent one end of said handle, said head having a plurality of circumferential spaced apart recesses and being rotatable with respect to said handle; a pawl-like lever pivotally connected to said handle, said lever being pivotal between a head-locking position wherein an end portion thereof seats in one of said recesses to prevent relative rotation of said head with respect to said handle and a head-released position wherein said lever end portion is removed from said recesses; releasable means for locking said lever in its head-locking position; radially extending cutters mounted on the outer end portion of said drive shaft means; a mounting bracket mounted on said head for sliding movement along a line parallel to the rotational axis of said drive shaft means; means for releasably locking said bracket to said head; a first work-engaging surface slidably mounted on said bracket for movement radially with respect to the rotational axis of said drive shaft means; a second work-engaging surface fixed with respect to said first-work-engaging surface disposed in a plane normal to the plane of said first work-engaging surface; and means for releasably locking said work-engaging surfaces to said bracket.

5. In a drivable routing device as set forth in claim 4, including, a third work-engaging surface mounted on said bracket for sliding movement, said third work-engaging surface being disposed in a plane substantially parallel to the plane of said second work-engaging surface; and means for releasably locking said third work-engaging surface to said bracket.

6. An attachment for use with a portable electric motor; drive shaft means operatively connected to the electric motor; mounting means fixed to the housing of said electric motor; a head rotatably supported on said drive shaft means; a toothed cutter mounted on the outer end portion of said drive shaft means; a plurality of work-engaging guides adjustably mounted on said head; manually operable means carried by said mounting means for releasably securing said head to said mounting means in various rotational positions with respect to said mounting means; said mounting means including a grippable handle, and said means for releasably securing said head to said mounting means including a lever pivotally mounted on said handle, said lever being pivotal between a head-locked position wherein said lever operatively engages said head to prevent relative rotation thereof with respect to said mounting means and a head-unlocked position wherein said lever is out of operative engagement with said head to permit rotation of said head with respect to said mounting means.

References Cited in the file of this patent

UNITED STATES PATENTS

| | | |
|---|---|---|
| 2,140,120 | Tomarin | Dec. 13, 1938 |
| 2,238,304 | Belanger | Apr. 15, 1941 |
| 2,672,898 | Schuster | Mar. 23, 1954 |
| 2,705,513 | Moeller | Apr. 5, 1955 |
| 2,741,282 | Wieting | Apr. 10, 1956 |
| 2,800,933 | Michael | July 30, 1957 |